United States Patent

McMullen et al.

[15] 3,662,174
[45] May 9, 1972

[54] NUCLEONIC GAUGES HAVING SOURCE WINDOW PROTECTOR PLATES WITH COMPRESSED AIR WIPE ARRANGEMENTS FOR USE IN OIL SPRAY ENVIRONMENTS

[72] Inventors: James M. McMullen, Columbus; Douglas A. Berg, Worthington, both of Ohio

[73] Assignee: Industrial Nucleonics Corporation

[22] Filed: Dec. 15, 1969

[21] Appl. No.: 885,222

[52] U.S. Cl. .......................... 250/83.3 D, 250/43.5 D, 250/52
[51] Int. Cl. ................................................. G01t 1/16
[58] Field of Search ................. 250/83.3 D, 43.5 D, 50, 52

[56] References Cited

UNITED STATES PATENTS

| 2,814,953 | 12/1957 | Callaghan | 73/355 |
| 3,426,200 | 2/1969 | Lehman et al. | 250/83.3 D |

*Primary Examiner*—James W. Lawrence
*Assistant Examiner*—Morton J. Frome
*Attorney*—Marechal, Biebel, French & Bugg

[57] ABSTRACT

A nucleonic gauge for use with moving strip or web material in which oil particles or oil mist is entrained with the web. The nucleonic gauge incorporates protector plates, there being one plate associated with the source housing and another plate associated with the detector housing. Each plate includes air passageways through which air is directed under pressure at a region closely adjacent the source window and the detector window for preventing the occurrence of oil droplets or other foreign material on these windows. The plates further provide mechanical protection against window damage in the event that there is a break in the sheet material.

9 Claims, 9 Drawing Figures

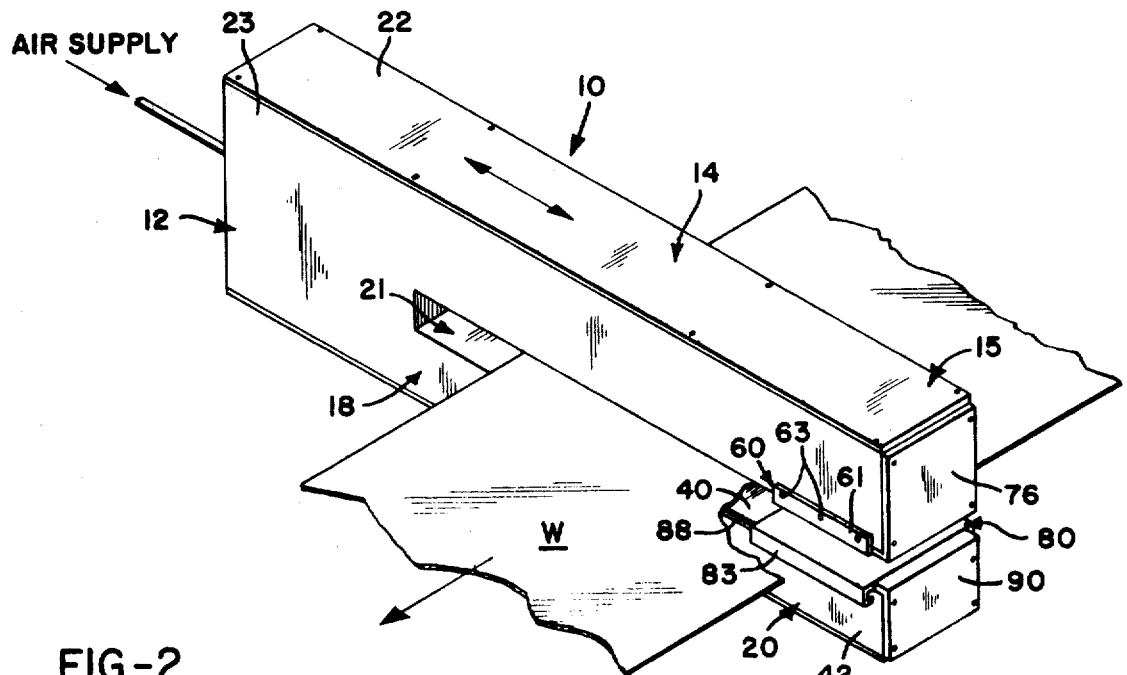
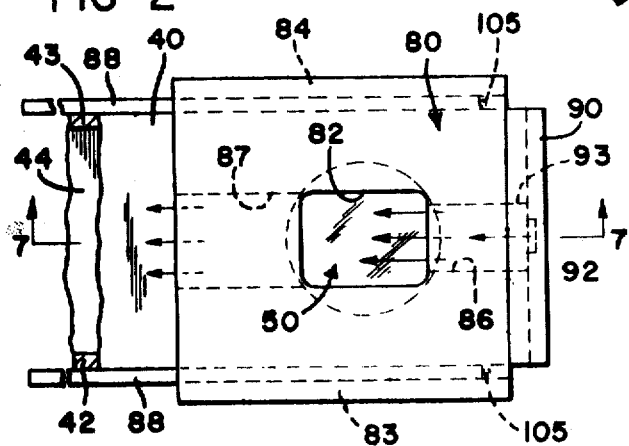
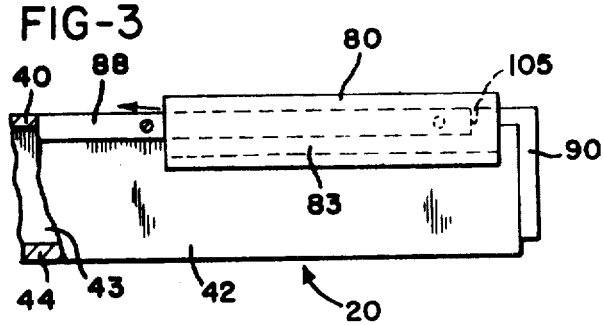

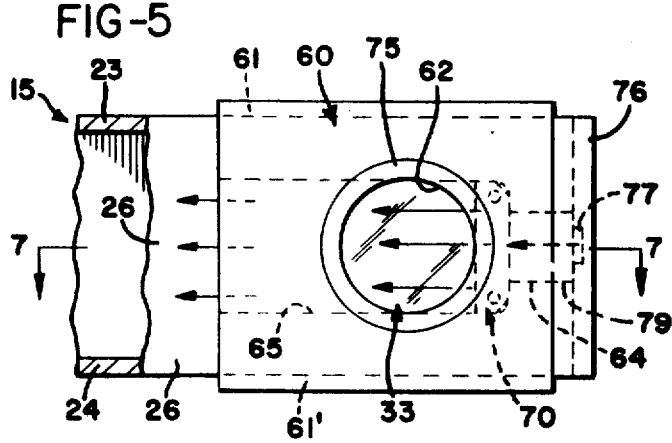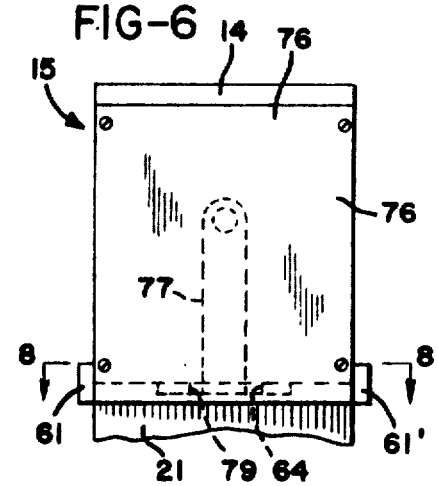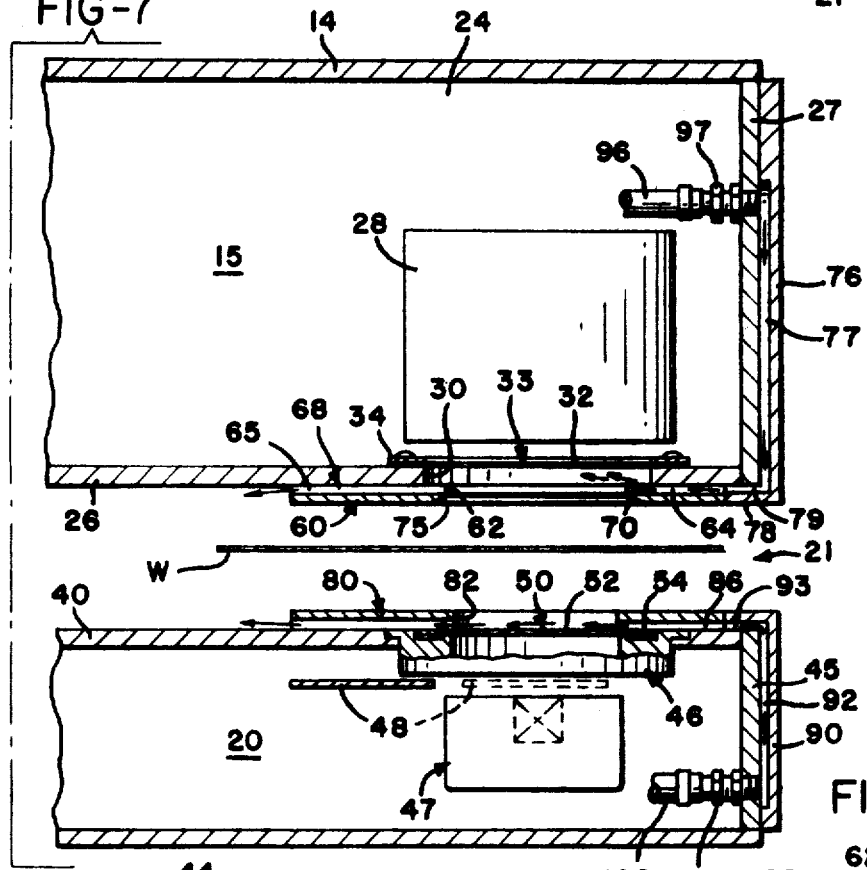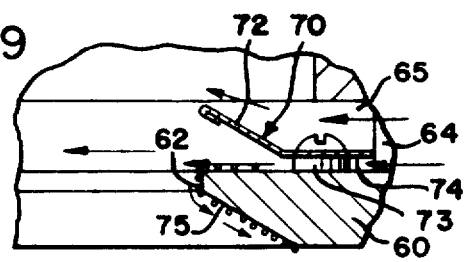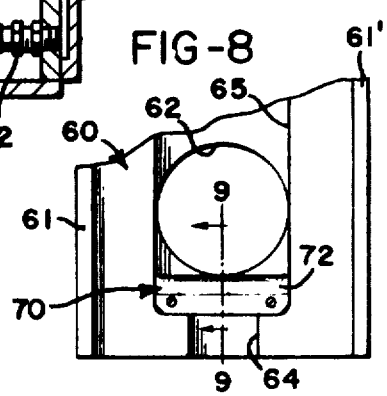

3,662,174

NUCLEONIC GAUGES HAVING SOURCE WINDOW PROTECTOR PLATES WITH COMPRESSED AIR WIPE ARRANGEMENTS FOR USE IN OIL SPRAY ENVIRONMENTS

BACKGROUND OF THE INVENTION

The present invention relates to the art of nucleonic gauging and more particularly to the on-line measurement of the thickness or basis weight of moving strip or sheet material. A particular problem which occurs in an industrial environment is that of the accumulation of foreign material on the source and/or detector windows. Such accumulation causes errors in the read out since the foreign material results in absorption of the nucleonic energy and is read as a change or increase in basis weight or thickness. This problem is particularly acute in installations where the nucleonic gauge is used for measuring the thickness or weight of sheet aluminum or sheet steel as it passes from a rolling mill. In these and similar industrial environments the sheet is bathed in oil, and a mist or cloud of oil forms which is carried along by the sheet. The entrained oil has a tendency to collect and form droplets on the surfaces of the windows of the source and the detector housings. As the droplets accumulate, fall, and run they present an everchanging mass in the pass gap which adversely affects the accuracy of the measurement.

A further difficulty of sensitive gauges is that of protecting the source and detector windows against damage and breakage which is likely to occur in the event that the sheet material breaks. The windows, of necessity, are formed of thin, light weight material. Sheet mylar is an example. As a result these windows are more fragile than are the other exposed parts of the gauge. The web or sheet material being measured is moving at a relatively high velocity, which may be in the order of 500 feet per minute or more, and the pile up of sheet material against the gauge, were the window not otherwise protected, frequently results in the window being torn or broken, thus necessitating a shut down of the line until the gauge can be repaired and placed back into service.

SUMMARY OF THE INVENTION

The present invention is directed to apparatus for protecting the source and detector windows and for decreasing the likelihood of window damage in an industrial accident of the type referred to above and, at the same time, for forming a means by which the windows may be kept free of the accumulation of dilatorious material, such as droplets of oil, dust, particles of metal, or other material which may be in the region of the pass gap. For this purpose, the source and detector heads are provided with plate means which may form a permanent part of the installation. This preferably includes a first plate mounted on the detector head in the region of the pass gap and formed with an aperture which is aligned substantially with the detector window. The aperture in this plate is chosen so as to be in substantial non-interferring relation with the nucleonic energy, but preferably is formed with a diameter which is somewhat smaller than that of the window, to provide further mechanical protection for the window. The plate is further formed with an air passageway which opens into the region of the plate aperture and is arranged so as to direct air at high velocity into wiping impingement with and across the window so as effectively to prevent the accumulation of oil droplets on the window surface.

A second plate, similar to the first plate, is provided for the source housing and is similarly positioned in the pass gap and is provided with an opening or aperture arranged in substantial alignment with the source window. Again, this opening is chosen to have a diameter which is in non-interfering relation to the path of the nucleonic energy, but preferably less than that of the source window. The resulting structure is one in which both the source and the detector windows are recessed inwardly of the surfaces of these plates so that the likelihood of breakage of the windows is substantially reduced. The second plate is similarly formed with an air passageway opened into the plate aperture for directing air under pressure across the source window to prevent the accumulation of foreign material thereon. Preferably, the second plate also is provided with an air exit passage through which air and entrained material is removed from the measuring region.

As a further feature of the invention, the upper plate, which is normally the plate associated with the detector, is formed with an annular chamfer at the opening defining an inclined wall along which droplets of oil may naturally flow out of the measuring region. As the oil collects, it drops at a location outside of the measuring region. This is particularly important in that the drops do not fall on the source window when the gauge is off sheet for source standardization.

It is accordingly an important object of this invention to provide plates for mechanically protecting the windows of source and detector housings on a nucleonic gauge.

Another important object of this invention is the provision of an air wipe for the windows of a nucleonic gauge which effectively prevents the accumulation of oil droplets and the like on the windows.

A further object of the invention is the provision, in a nucleonic gauge, of window protecting devices associated with the source and detector housings which incorporate air passages through which air may be directed at relatively high velocity for wiping the window surfaces substantially free of the accumulation of oils and the like and for providing mechanical protection for the windows.

These and other objects and advantages of the present invention will be apparent from the following description, the accompanying drawings and the appended claims.

BRIEF DESCRIPTION OF THE DRAWINGS

FIG. 1 is a perspective view of a gauge constructed according to this invention;

FIG. 2 is a fragmentary plan view of the source housing;

FIG. 3 is a side elevation of the source housing;

FIG. 4 is a front elevation of the source housing;

FIG. 5 is a fragmentary plan view looking upwardly at the detector housing;

FIG. 6 is a front view of the detector housing;

FIG. 7 is an enlarged vertical section through the source and detector housings taken generally along the reference lines 7—7 of FIGS. 2 and 5;

FIG. 8 is a plan view of the inside surface of the plate on the detector housing looking along the lines 8—8 of FIG. 6; and FIG. 9 is a fragmentary enlarged section taken generally along the line 9—9 of FIG. 8.

DESCRIPTION OF PREFERRED EMBODMENT

Referring to the figures of the drawing, a nucleonic thickness measuring gauge constructed according to this invention is shown generally at 10 in FIG. 1 as including a traversing C-bracket 12. The bracket 12 may be suitably mounted on a transversely oriented track, not shown, so that the bracket may be moved to an on-line measuring position as shown in FIG. 1 and to an off-line position, such movement being in the direction as identified by the arrow 13. An example of a suitable traversing arrangement is shown in Holben U.S. Pat. No. 2,967,242 of 1961. The general structure and operation of the gauge may be according to the teaching of Chope U.S. Pat. No. 2,790,945 of 1957 or Chope U.S. Pat. No. 2,829,268 of 1958, and may be operated at a fixed transverse position with respect to the web W of the moving strip or sheet material, or alternatively, the gauge may be caused to take profile measurements by traversing movement, according to known practices in the art.

The C-bracket 12, at its outer extremities, forms the housings which contain the nucleonic radiation source and the detector. For this purpose, the upper arm 14 of the bracket 12 is terminated at its extremity in a rectangular structure defining a detector housing 15, the further details of which are shown in FIGS. 5, 6 and 7. The lower arm 18 is similarly terminated in a rectangular structure defining a source housing 20 which is positioned and spaced vertically beneath the detector housing 15, thus forming and defining therebetween a pass gap 21, as best shown in FIG. 7, through which the web W of sheet material passes during measurements. The details of the source housing 20 are further illustrated in FIGS. 2, 3, 4, and 7.

Referring first to the detector housing 15, it comprises essentially four rectangularly arranged plates or sheets, comprising a removable top sheet 22, a pair of spaced parallel side sheets 23 and 24 (FIG. 5) a bottom sheet 26, and an end sheet 27. These sheets, which may consist of ¼ sheet steel, together form the detector housing within which may be contained an ion chamber detector 28 which may be constructed according to the teachings of Martin et al. U.S. Pat. No. 3,396,275 of 1968. According to conventional practice, the lower or bottom sheet 26 of the detector housing 15 is formed with a circular opening 30 in substantial alignment with the chamber 28, and this opening is closed by a thin sheet 32 of plastic film or other suitable material and defines the source window 33. The sheet 32 is positioned on the upper surface of the lower plate 26 and is removably retained by a retainer ring 34 by access through the removal of the cover sheet 22.

Referring to the source housing 20, this is similarly formed with an upper sheet 40, a pair of parallel disposed side sheets 42 and 43 (FIG. 2) a bottom sheet 44, and an end plate 45, secured in a box or rectangular like construction. The parts forming the source housing may also be formed of ¼ inch sheet steel.

The upper sheet 40 receives a source housing assembly indicated generally at 46 in FIG. 7, and this assembly includes a source and shield 47, a movable shutter 48 and a source window 50. The window 50, like the window 33, is preferably formed of a sheet 52 of thin plastic material and is retained on the assembly 46 by a retainer ring 54. In the case of the source housing, the window 50 is retained substantially flush with the upper surface of the plate 40 on the apertured source assembly 46 and defines the window through which radiation may pass from the source 47 to the detector 28. The nucleonic source 47 may be constructed according to known practices to include a penetrative radiation material by which a source of beta, gamma, brensstrahlung or other type of radiation is produced to erradiate the material W to be measured. The choice of radiation depends on the character and the density of the material W. Typical examples of beta emitters are Strontium 90 and Krypton 85, and typical gamma emitters are Americium 241 and Cesium 137. The shutter 48 and the associated mechanism may be constructed according to the teachings of the copending application of Trachevski et al. Ser. No. 634,363 filed Apr. 27, 1967.

The gauge 10 of the present invention is particularly adapted for use in the measurement of the thickness or basis weight of sheet material passing from a rolling mill. The material W may accordingly be sheet aluminum which may be either hot or cold and which has a surface which has been bathed with oil at the vicinity of the rolling mill. The resulting environment is one in which a mist or droplets of oil are entrained with the sheet and carried into the vicinity of the source and detector heads. This oil mist has a tendency to accumulate and form droplets of oil which, in a relatively short time, form on all of the exposed surfaces of the source and detector housings. This has no adverse affect per se on the gauge except when such droplets collect on the surfaces of and in the vicinity of the windows 33 and 50, where their presence results in an attenuation of the signal being received by the detector 28. Further, as such droplets accumulate they reach the point where they drop by gravity, or run, or form and collect in pools which will collect and run, thus forming an ever changing mass in the pass gap 21 and resulting in the introduction of an error in the read-out.

A further problem resides in the fact that the windows 32 and 50 are the most fragile exposed portion of the gauge. These windows are normally formed of relatively thin sheet material such as sheet Mylar. They are thus subject to damage upon the occurrence of an industrial accident which frequently consists of the breaking of the web W and the piling up of the broke against the gauge. Since the web is moving at a relatively high velocity, which may be in the order of 500 feet per minute or more, considerable forces may momentarily result which are sufficient to rupture or break a window if a portion of the web should come into contact with the window.

The present invention is accordingly directed to structure which effectively purges the windows of the accumulation of dilatorious material, such as oil droplets, dust of other residue, and at the same time provides mechanical protection for the windows. For this purpose, the detector housing 15 includes first plate means mounted thereon and indicated generally by the reference numeral 60 in FIG. 1. The plate 60 is effectively positioned in the pass gap 21 and is mounted in superimposed position on the lower surface of the detector housing sheet 26, and is provided with an aperture 62 which is aligned substantially with the opening 30 and the window 33. The source housing 20, in turn, is provided with a second plate 80 supported on the upper surface of the top sheet 40, which second plate is similarly formed with an aperture 82 aligned substantially with the window 50.

Referring first to the detector housing 15 and the arrangement of the plate 60, reference may be had to the views of FIGS. 5, 6 and 7. There it will be seen that the plate 60 is formed with a pair of upstanding side flanges 61 and 61' which are received over the adjacent side sheets 23 and 24 of the housing 15 and may be retained by suitable screws 63 as shown in FIG. 1. The plate 60 is provided with an air inlet channel or passage 64 which can best be seen in FIG. 8. The passage 64 may be formed by milling or otherwise cutting a slot in the upper surface of the plate 60. The passage 64 opens into a somewhat wider passage 65 of the same depth which, in turn, opens into one side of the plate aperture 62. Further, the passage 65 extends from a region at the opposite side of the aperture 62 across the remaining length of the plate 60 and defines an air exit passage 68 through which air and entrained oil particles may flow away from the measuring zone.

Since the window 33 is somewhat recessed in the housing 15 by reason of it being positioned on the upper surface of the plate 26, as shown in FIG. 7, it is desirable to provide deflector means by which a major portion of the air flow may be diverted upwardly into purging and wiping contact with exposed lower surface of the window 33. For this purpose, a transversely oriented sheet metal deflector 70 may be positioned within the passage 65 adjacent the passage 64 and formed with an upwardly extending tongue 72. The deflector 70 is mounted in spaced relation to the floor of the passage 65 by reason of spaced washers 73 to provide a small space 74 thereunder through which a portion of air may flow, for the purpose of preventing the formation of a low pressure region or pocket on the lea side of the deflector 70 which would otherwise tend to accumulate oil. The lower surface of the plate 60 is further formed with a circular and outwardly flared chamber 75 (FIG. 9) in the region of the aperture 62, leading away from the measuring region, along which droplets of oil may flow and effectively be removed from interference with the measurement.

Means for applying air under pressure to the inlet passage 64 includes an auxiliary end plate 76 mounted on the outside surface of the housing end sheet 27 and formed with a vertically aligned milled passageway 77 on its inside surface. The lower end of the auxiliary plate 76 is formed with a foot 78 which underlies the end of the sheet 27 and is in abutment with the adjacent edge of the plate 60 and is similarly formed with a right-angled conduit or milled slot 79 communicating with the inlet passage 64.

Referring to FIGS. 2–4, it is seen that the plate 80 associated with the source housing 20 is formed with a pair of depending flanges 83 and 84 which extend downwardly adjacent to but spaced somewhat from the side plates 42 and 43 and have inwardly turned lower ends 85. A pair of track rails 88 are secured to the outer sides of the plates 42 and 43 adjacent the upper surface of the top sheet 40 and provide means for supporting the plate 80 as well as providing for longitudinal movement of the plate, for the purpose to be described.

The plate 80 is similarly formed with a milled slot defining an inlet passage 86 opening into the aperture 82. The plate is further formed with a slot 87 defining an air exit passage diametrically opposite the inlet passage 86.

Means for applying air under pressure to the inlet passage 86 includes a further auxiliary end plate 90. As best shown in FIG. 7, the upper end of the plate 90 is L-shaped and is brought over the upper surface of the source housing end plate 45. The end plate 90 is formed with a vertically aligned slot 92, and a right angle upper slot 93 communicating with the inlet passage 86.

Means for applying air under substantial pressure for purging and wiping the respective windows includes an air line 96 in the housing 15 and a union 97 in the end plate 27 for applying air to the passage 77 in the auxiliary end plate 76. The source housing 20 may also include a conduit 100 and a union 102 in the end plate 45 for applying air under pressure to the passage 86.

It will be seen that the aperture 62 formed in the plate 60 is of a diameter which is somewhat less than that of the window 33, and the aperture 82 formed in the plate 80 is, again, somewhat less than that of the window 50. The respective plate apertures are preferably made as small as possible without interferring with the path of radiation flowing from the source 47 to the detector 28, to provide additional mechanical protection for the respective windows. As shown in FIG. 2, the aperture 82 need not necessarily be circular, and a rectangular aperture may be suitable or preferred.

In the event that the window 33 becomes damaged, it may be replaced by access through the removal of the upper sheet 22 of the housing 20. However, the source window 50 is removed by access through the pass gap 22. Accordingly, the plate 80 associated with the housing 20 is movable longitudinally of the lower arm 18 on the track rails 88. A pair of depending pins 105 are normally received over the ends of the rails, as shown in FIG. 4, and serve to key the plate 80 in place in abutment against the inwardly turned end of the auxiliary end plate 90, and when it is desired to slide the plate 80 inwardly, it may be raised or lifted to the point where the pins 105 clear the end of the rails, the inwardly turned ends 85 providing sufficient clearance for this purpose. The plate 80 may then be slid inwardly to expose the window 50 as well as the source assembly 46 for service and replacement as desired.

In the operation of the invention, air under substantial pressure, in the order of 60–80 psi, for example, is applied to the conduits 96 and 100. A purging curtain of air is thus applied against each of the exposed surfaces of the windows 33 and 50 through the respective inlet passages 64 and 86. In the case of the plate 60, the deflector 70 directs a major portion of the air upwardly into the recess defined by the opening 30, and the exhaust air as well as the entrained oil drops are carried away from the measuring zone through the exit passage 65. A smaller portion of the air passes through the space 74 beneath the deflector 70 and prevents what might otherwise be a low pressure pocket, and purges this region of accumulation of oil droplets. As shown in FIG. 9, the oil droplets, due to surface tension, tend to adhere to adjacent surfaces and the outwardly flared chamfer 75 forms a path along which these droplets may flow away from the measuring region.

The air applied by the conduit 100 is directed by the auxiliary plate 90 to enter the inlet passage 86. This passage is of substantial width, corresponding generally to the width of the aperture 82, and forms an air wipe across the upper surface of the window 50. While both of the windows will necessarily be wetted by the oil particles, the movement of air across these windows is such as to prevent the formation or accumulation of droplets which would adversely affect the measurement. Again, the spent air and entrained particles are carried through the exit passage 86 out of the measuring zone.

In the event of breakage of the web, the plates 60 and 80 provide substantial additional mechanical protection for the respective windows. While it is still possible to incur window breakage, the likelihood of breakage has been substantially reduced. While the present invention discloses window protecting and air purging arrangements which are formed as auxiliary attachments to the respective source and detector housings, it is within the scope of the invention to form these parts integrally with such housings.

While the form of apparatus herein described constitutes a preferred embodiment of the present invention, it is to be understood that the invention is not limited to this precise form of apparatus, and that changes may be made therein without departing from the scope of the invention which is defined in the appended claims.

What is claimed is:

1. In a nucleonic gauge for measuring the basis weight or thickness of moving strip material in which a source housing is positioned at one side of a pass gap and has a window opening at said gap and a detector housing is positioned at the opposite side of said pass gap and also has a window opening at said gap for receiving radiation from said source, in an industrial environment in which oils or other substances have a tendency to deposit or collect on the source and detector windows, the improvement comprising first plate means mounted on said detector housing and having means defining an aperture aligned substantially with said detector window and providing mechanical protection for said window against damage which may occur upon the breakage of said strip material or other industrial accident, means in said first plate means defining an air inlet passage opening at said plate aperture, second plate means mounted on said source housing and having an aperture therein in substantial alignment with said source window providing mechanical protection against damage to said source window, means in said second plate means defining an air inlet passage opening at the aperture thereof, and means for applying air under pressure to said plate inlet passages, said plate means directing said air for flow across said source and detector windows and into effective oil-wiping impingement thereon for maintaining said windows substantially free of accumulation of deposits.

2. The gauge of claim 1 further comprising means defining an outwardly flared chamfer at the aperture of one of said plate means for providing a radially outwardly inclined path for the flow of oil droplets away from the window protected by said one plate means.

3. The gauge of claim 1 in which said detector window is recessed in said detector housing and further comprising a transversely oriented deflector in the region of said first plate aperture positioned to receive air from said first plate inlet passage and to deflect said air against said detector window.

4. The gauge of claim 3 further comprising means mounting said deflector in spaced relation to said first plate means providing a space for air to flow between it and said first plate means to prevent the formation of a low pressure pocket on the lea side of said deflector which would otherwise tend to accumulate oil droplets.

5. The gauge of claim 1 in which said plate apertures are smaller in diameter than the associated housing windows.

6. In a nucleonic gauge for measuring the basis weight or thickness of moving strip material in which a source housing is positioned at one side of a pass gap and has a window opening at said gap and a detector housing is positioned at the opposite side of said pass gap and also has a window opening at said gap for receiving radiation from said source, for use in an environment in which oil droplets are entrained with the strip material to be measured and which have a tendency to deposit on the source and detector windows, the improvement comprising a first plate mounted on said detector housing and having means defining an aperture aligned substantially with said detector window with said window being recessed therein for providing protection for said window, means in said first plate means defining an air inlet passage terminating at said aperture and an exit passage looking therefrom, a second plate mounted on said source housing and having an aperture therein in substantial alignment with said source window, with said source window being recessed therein providing protection against damage to said source window, means in said second plate defining an air inlet passage opening into the aperture thereof and an air exit passage leading therefrom, means for applying air under pressure to said first plate inlet passage for flow across said detector window into the associated said exit passage, and means for applying air under pressure to said second plate inlet passage for wiping flow across said detector window and into the associated said exit passage, for maintaining said windows substantially free of accumulation of oil droplets.

7. The gauge of claim 6 further comprising rail means mounted on said source housing and providing for movement of said plate with respect to said source housing for access to said source window.

8. The gauge of claim 6 further comprising means defining an outwardly flared chamfer on said first plate in surrounding relation to said first plate aperture providing an outwardly inclined path for the flow of oil droplets away from said detector window.

9. The gauge of claim 6 in which apertures formed in said plates are smaller in diameter than that of the associated housing windows.

* * * * *